(12) United States Patent
Rozsavolgyi et al.

(10) Patent No.: US 8,292,263 B1
(45) Date of Patent: Oct. 23, 2012

(54) MANHOLE PIPE SHUNT DEVICE

(76) Inventors: George Rozsavolgyi, Montgomery, IL (US); Jeffrey J. Carter, Somonauk, IL (US); Marilyn K. Carter, Somonauk, IL (US)

( * ) Notice: Subject to any disclaimer, the term of this patent is extended or adjusted under 35 U.S.C. 154(b) by 858 days.

(21) Appl. No.: 12/332,815

(22) Filed: Dec. 11, 2008

(51) Int. Cl.
*F16L 29/00* (2006.01)
(52) U.S. Cl. .......... 251/150; 251/149.9; 138/97; 285/97
(58) Field of Classification Search .................. 251/148, 251/149.9–156, 314–317.01; 285/97; 138/97
See application file for complete search history.

(56) References Cited

U.S. PATENT DOCUMENTS

| | | | |
|---|---|---|---|
| 4,578,188 A | 3/1986 | Cousino | |
| 4,932,241 A | 6/1990 | Carmody et al. | |
| 4,982,929 A * | 1/1991 | Spurling | 251/149.9 |
| D337,633 S | 7/1993 | Drager et al. | |
| 5,996,621 A * | 12/1999 | Hagiwara et al. | 137/565.33 |
| 6,012,477 A | 1/2000 | Hagiwara et al. | |
| 6,594,849 B1 | 7/2003 | Nimens | |
| 6,959,734 B2 | 11/2005 | Lundman | |
| 7,455,077 B2 * | 11/2008 | Lundman | 138/93 |
| 2006/0153640 A1 * | 7/2006 | Hofmann | 405/184.1 |
| 2009/0032131 A1 * | 2/2009 | Boettner | 138/121 |

FOREIGN PATENT DOCUMENTS

| | | | |
|---|---|---|---|
| GB | 2270357 A | * | 3/1994 |
| JP | 3-219196 A | * | 9/1991 |

* cited by examiner

*Primary Examiner* — John K Fristoe, Jr.
*Assistant Examiner* — Jessica Cahill

(57) ABSTRACT

A pipe shunt device for allowing sewage to bypass a trough in a manhole and travel from an inlet port to an outlet port comprising a hose, a first plug component having a first plug removably attachable to the first end of the hose via a first attachment clamp; a second plug component having a second plug removably attachable to the second end of the hose via a second attachment clamp; wherein a valve lever is disposed in the first plug component that allows or prevents sewage from flowing from the inlet port to the outlet port.

5 Claims, 4 Drawing Sheets

US 8,292,263 B1

MANHOLE PIPE SHUNT DEVICE

FIELD OF THE INVENTION

The present invention is directed to a shunt device for pipes in a manhole. More particularly, the present invention is directed to a pipe shunt device for allowing sewage to continue to flow in a manhole while the manhole is under repair.

BACKGROUND OF THE INVENTION

In a manhole, sewage enters in from a first pipe (e.g., inlet port) and empties into a trough. From the trough, the sewage exits the manhole via a second pipe (e.g., outlet port). If repairs need to be made in a manhole, the flow of sewage through pipes must be stopped for very long periods of time with plug-like devices. This can often cause sewage backup in the homes of local residents. Also, this blockage of the flow can result in forceful expulsion of waste when disconnecting the plug, which can cause damage to fresh mortar repairs and injuries to manhole workers. The present invention features a pipe shunt device for allowing sewage to flow in a manhole while repairs take place in the manhole. The pipe shunt device delivers sewage from the first pipe in the manhole to the second pipe in the manhole while bypassing the trough.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
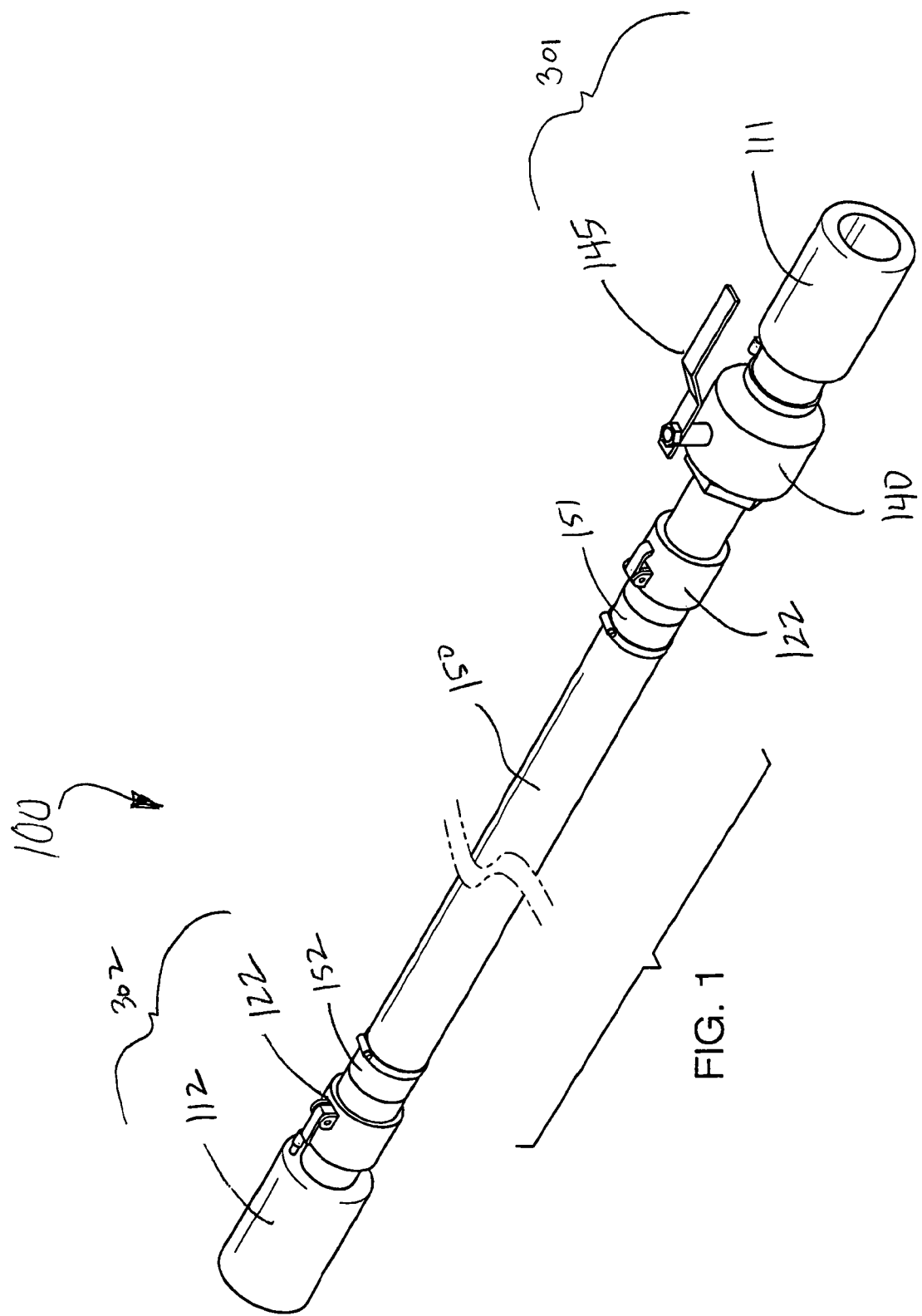
FIG. 1 is a perspective view of the pipe shunt device of the present invention.
Figure 2:
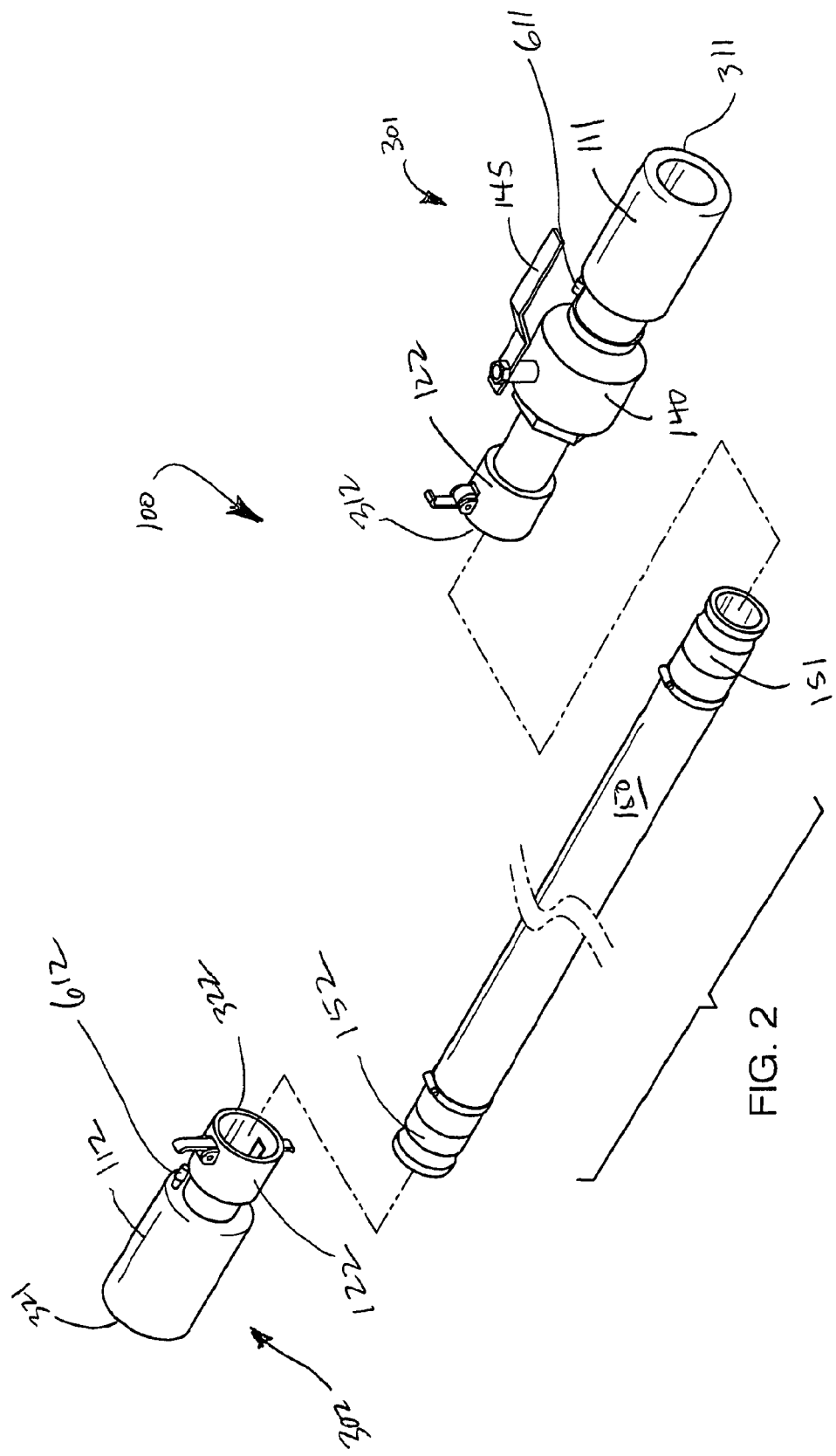
FIG. 2 is a perspective view of the pipe shunt device of the present invention.
Figure 3:
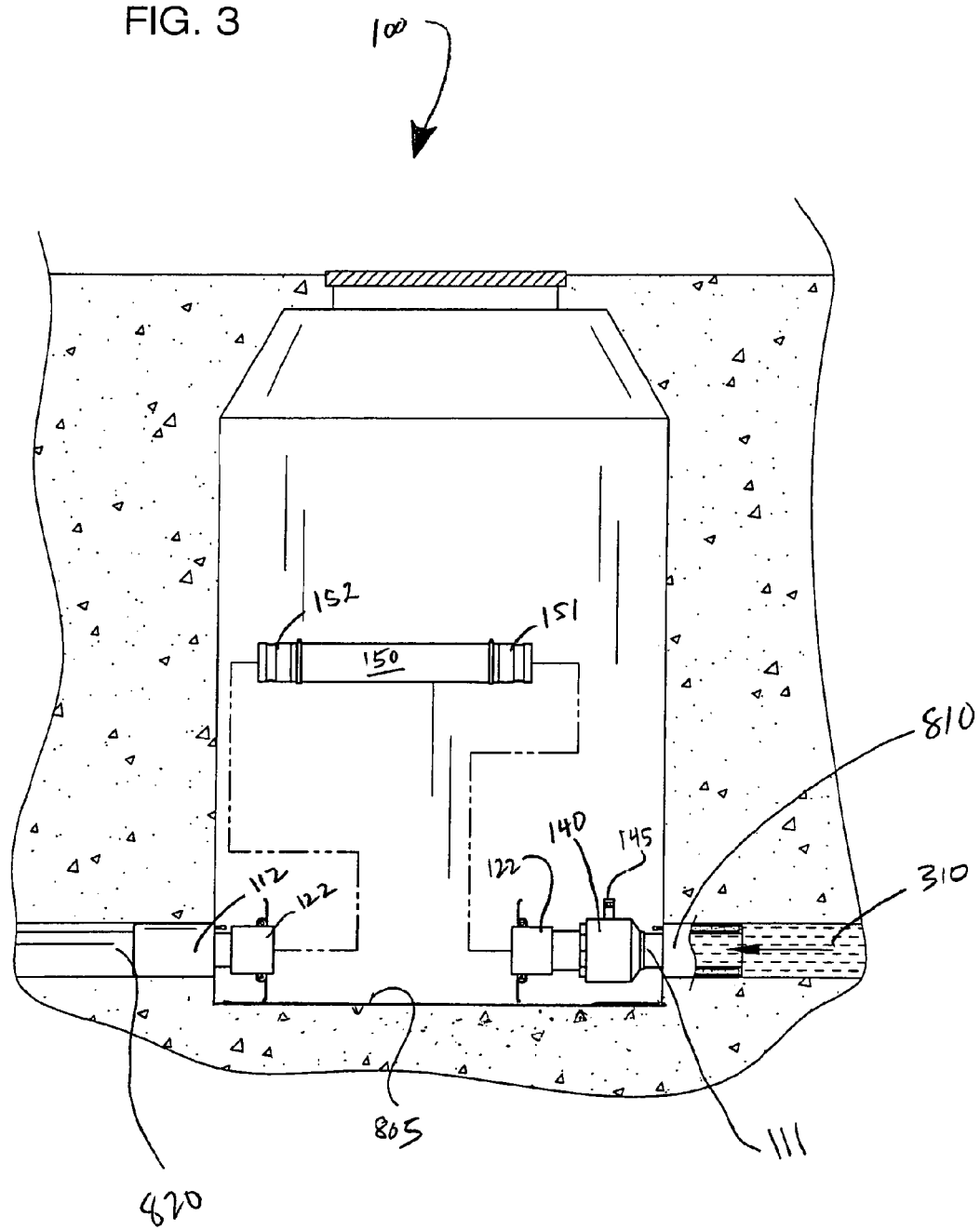
FIG. 3 is a side view of the pipe shunt device of the present invention.
Figure 4:
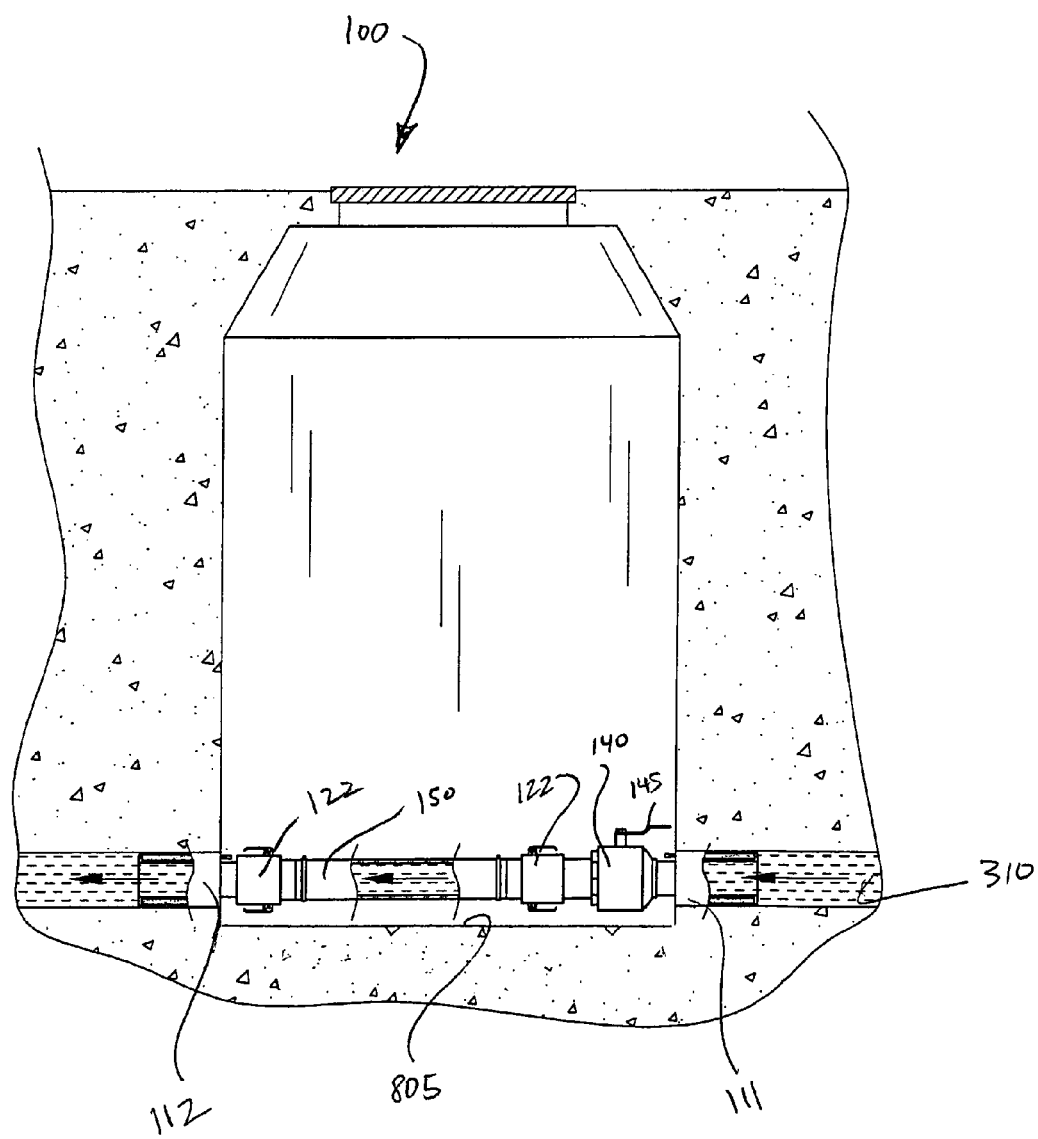
FIG. 4 is a side view of the pipe shunt device of the present invention.

Referring now to FIGS. 1-4, the present invention features a pipe shunt device 100. The pipe shunt device 100 allows sewage to flow in a manhole while repairs take place in the manhole. The pipe shunt device 100 delivers sewage to bypass the trough 805 when traveling from the inlet port 810 to the outlet port 820.

The pipe shunt device 100 comprises a hose 150 having a first end 151 and a second end 152. The hose 150 can be flexible or rigid. A first plug component 301 can be removably attached to the first end 151 of the hose 150. The first plug component 301 has a first end 311, a middle portion, and a second end 312; a first attachment clamp 122 is disposed at the second end 312 of the first plug component 301. The first attachment clamp 122 can be removably attached to the first end 151 of the hose 150. The first attachment clamp 122 allows the first plug component 301 to be fit snugly with the first end 151 of the hose 150 to prevent leaks.

A first plug 111 is disposed at the first end 311 of the first plug component 301. The first plug 111 is for inserting into the inlet port 810 of manhole. The first plug 111 is generally cylindrical and has a hollow center.

A first air valve 611 is disposed on the first plug 111. The first air valve 611 allows the first plug 111 to expand such that the first plug 111 is tightly secured in the inlet port 810. The hollow center of the first plug 111 remains hollow such that when the pipe shunt device 100 is properly installed, fluid/sewage can travel from the inlet port 810 through the first plug 111 and into the pipe 150.

A valve lever component 140 is disposed in the middle portion of the first plug component 301 between the first attachment clamp 122 and the first plug 111. The valve lever component 140 comprises a valve lever 145 that is movable between an open position and a closed position. When the valve lever 145 is in the open position, a liquid 310 is able to flow from the first plug 111 to the hose 150. When the valve lever 145 is in the closed position, the liquid 310 is prevented from flowing from the first plug 111 to the hose 150 or from the hose 150 to the first plug 111. When the first plug 111 is inserted and inflated in the inlet port 810 of the manhole, the valve lever 145 is in the closed position. The hose 150 can be then attached to the first plug component 301. When ready, a user can move the valve lever 145 to the open position to allow the sewage to begin flowing again.

A second plug component 302 having a first end 321 and a second end 322 can be removably attached to the second end 152 of the hose 150. A second attachment clamp 122 is disposed at the second end 322 of the second plug component 302, and the second attachment clamp 122 can be removably attached to the second end 152 of the hose 150. The second attachment clamp 122 allows the second plug component 302 to be fit snugly with the second end 152 of the hose 150 to prevent leaks.

A second plug 112 is disposed at the first end 321 of the second plug component 302. The second plug 112 is for inserting into the outlet port 820 of the manhole. The second plug 112 is generally cylindrical and has a hollow center, similar to the first plug 111.

A second air valve 612 is disposed on the second plug 112. The second air valve 612 allows the second plug 112 to expand such that the second plug 112 is tightly secured in the outlet port 820. The hollow center of the second plug 112 remains hollow such that when the pipe shunt device 100 is properly installed, fluid/sewage can travel from the pipe 150 through the second plug 112 and into the outlet port 820.

In some embodiments, the first plug 111 can be inserted into the inlet port 810 and expanded, while the valve lever 145 is in the closed position. Next, the second plug 112 can be inserted into the outlet port 820 and expanded. Then, the first end 151 of the hose 150 can be attached to the first attachment clamp 122 and the second end 152 of the 150 can be attached to the second attachment clamp 122. In some embodiments, when the valve lever 145 is in the closed position, the liquid 310 is prevented from flowing from the inlet port 810 to the outlet port 820. When the valve lever 145 is moved to the open position, liquid/sewage 310 is allowed to flow from the inlet port 810 to the outlet port 820. Then, the first end 151 of the hose 150 can be attached to the first attachment clamp 122 and the second end 152 of the hose 150 can be attached to the second plug attachment clamp 122.

The first and second attachment clamps 122 are similar to attachment clamps well known to one of ordinary skill in the art. In some embodiments, the clamps 122 are similar to clamps used in fire hoses. The attachment clamps 122 can move between a clamped position and an unclamped position. The clamps 122 provide snug fits between the first plug component 301 and the first end 151 of the hose 150, as well as between the second plug component 302 and the second end 152 of the hose 150. In the clamped position, the hose 150 is securely attached to the attachment clamps 122. In the unclamped position, the hose 150 can be pulled out of the attachment clamps 122.

The first air valve 611 and second air valve 612 are for securing the pipe shunt device 100 to the inlet port 810 and outlet port 820, respectively, by allowing the first plug 111 and the second plug 112 to expand. The air valves 611, 612 allow for secure and sealed connections between the plugs 111, 112 and the inlet port 810 and outlet port 820, respectively. This can help prevent leaks. Such air valves are well known to one of ordinary skill in the art. In some embodiments, the air valves allow the plugs 111, 112 to be deflated when the shunt device 100 is uninstalled.

The pipe shunt device 100 may be constructed in a variety of sizes to accommodate various inlet ports 810 and outlet ports 820. For example, in some embodiments, the first plug 111 and/or second plug 112 is between about 6 to 12 inches in diameter. In some embodiments, the first plug 111 and/or second plug 112 is between about 12 to 18 inches in diameter. In some embodiments, the first plug 111 and/or second plug 112 is between about 18 to 24 inches in diameter. In some embodiments, the first plug 111 and/or second plug 112 is between about 24 to 36 inches in diameter. In some embodiments, the first plug 111 and/or second plug 112 is more than about 36 inches in diameter.

The pipe shunt device 100 may be constructed from a variety of materials, for example a material comprising a rubber, a plastic, a metal, the like, or a combination thereof. In some embodiments, the first plug 111 and/or second plug 112 is constructed from a material comprising a rubber. In some embodiments, the pipe 150 is flexible. In some embodiments, the pipe 150 is constructed from a material comprising a polyvinylchloride (PVC).

The disclosures of the following U.S. Patents are incorporated in their entirety by reference herein: U.S. Pat. No. 6,012,477; U.S. Pat. No. 6,959,734; U.S. Pat. No. 4,578,188; U.S. Pat. No. 6,594,849; U.S. Pat. No. 4,932,241.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pipe shunt device for allowing sewage to bypass a trough in a manhole and travel from an inlet port to an outlet port, said pipe shunt device comprising:
    (a) a cavity disposed beneath a ground surface, wherein the cavity is a manhole;
    (b) a hose having a first end and a second end;
    (c) a first plug component having a first end, a middle portion, and a second end; wherein the second end of the first plug component is removably attached to the first end of the hose via a first attachment clamp;
    (d) a generally cylindrical first plug having a hollow center, said first plug disposed at the first end of the first plug component; wherein the first plug is for inserting into the inlet port;
    (e) a first air valve disposed on the first plug, wherein the first air valve allows the first plug to expand such that the first plug is tightly secured in the inlet port while the hollow center of the first plug remains hollow for fluidly connecting the inlet port to the hose;
    (f) a valve lever component disposed in the middle portion of the first plug component between the first attachment clamp and the first plug; wherein the valve lever component comprises a valve lever that is movable between an open position and a closed position; wherein when the valve lever is in the open position sewage is able to flow from the inlet port through the first plug to the hose; wherein when the valve lever is the closed position, sewage is prevented from flowing from the inlet port through the first plug to the hose;
    (g) a second plug component having a first end and a second end; wherein the second end of the second plug component is removably attached to the second end of the hose via a second attachment clamp;
    (h) a generally cylindrical second plug having a hollow center, said second plug disposed at the first end of the second plug component; wherein the second plug is for inserting into the outlet port; and
    (i) a second air valve disposed on the second plug, wherein the second air valve allows the second plug to expand such that the second plug is tightly secured in the outlet port while the hollow center of the second plug remains hollow for fluidly connecting the pipe to the outlet port;
wherein in the cavity disposed beneath the ground surface being the manhole, the first plug can be inserted into the inlet port and expanded while the valve lever is in the closed position, the second plug can be inserted into the outlet port of the sewer pipe and expanded, and the first end of the hose can be attached to the first attachment clamp and the second end the hose can be attached to the second attachment clamp; wherein the first air valve, the second air valve, and the hose are all disposed in the manhole, wherein the valve lever can then be moved to the open position such that sewage flows from the inlet port to the outlet port via the first plug component, the pipe, and the second plug component, wherein for deflation of the first plug for removal, the first air valve can be actuated to release air pressure, wherein for deflation of the second plug for removal, the second air valve can be actuated to release air pressure.

2. The pipe shunt device of claim 1, wherein the pipe is flexible.

3. The pipe shunt device of claim 1, wherein the pipe is generally rigid.

4. The pipe shunt device of claim 1, wherein the first plug and second plug are between about 6 to 18 inches in diameter.

5. The pipe shunt device of claim 1, wherein the first plug and second plug are between about 18 and 23 inches in diameter.

* * * * *